United States Patent [19]

Miller

[11] Patent Number: 5,107,437

[45] Date of Patent: Apr. 21, 1992

[54] PROCESS FOR ISOSTATIC MOLDING

[75] Inventor: Douglas J. Miller, Berea, Ohio

[73] Assignee: UCAR Carbon Technology Corporation, Danbury, Conn.

[21] Appl. No.: 495,640

[22] Filed: Mar. 19, 1990

[51] Int. Cl.$^5$ .................. B29C 45/77; B29C 45/76
[52] U.S. Cl. ................... 364/476; 264/40.4; 264/40.5; 425/140
[58] Field of Search .................. 364/473, 476; 264/40.1–40.6; 425/135, 140, 141, 149, 150

[56] References Cited

U.S. PATENT DOCUMENTS

| | | | |
|---|---|---|---|
| 4,244,897 | 1/1981 | Moon | 425/140 |
| 4,613,471 | 9/1986 | Harris | 264/40.4 |
| 4,816,197 | 3/1989 | Nunn | 425/140 |
| 4,852,028 | 7/1989 | Korpela et al. | 264/40.4 |
| 5,016,184 | 5/1991 | Gutjahr | 364/138 |

*Primary Examiner*—Jerry Smith
*Assistant Examiner*—Thomas E. Brown
*Attorney, Agent, or Firm*—E. Lieberstein

[57] ABSTRACT

A process for isostatic molding permitting density of the product being molded to be measured and controlled in-situ. The process is carried out by weighing the mold assembly in the fluid medium within the pressure vessel inclusive and exclusive of the powder charge with the latter weight determined by the difference between the weight of the mold assembly outside of the pressure vessel and its buoyant force in the pressure vessel.

11 Claims, 3 Drawing Sheets ic Molding

FIELD OF THE INVENTION

This invention relates to the field of isostatic molding and more particularly to an improved process for isostatic molding of powdered metal, carbon or ceramic particles into densified compact articles of uniform preselected density.

BACKGROUND OF THE INVENTION

Isostatic molding is a pressing process for densifying a powdered composition into a compact shape at pressures sufficient to obtain near theoretical density. Powder and particulate matter is densified under pressure acting through a suitable fluid medium preferably a liquid to achieve an omnidirectional high green density.

Current state of the art isostatic molding recognizes that density more than any other property influences the final mechanical and physical properties of the pressed material. Density determines the strength and physical properties of the compact billet both in the green and final sintered state. In current practice the green density level of the compressed product is indirectly controlled during the molding operation by setting a target pressure and controlling the rate of pressurization of the press until the target pressure is realized. Secondary process variables also include: temperature, hold time under compression mold filling techniques, and depressurization controls. Unfortunately, experience has shown that product uniformity, particularly for a carbon or ceramic composite cannot be achieved with a high degree of accuracy by control of pressure with or without adjustment of the other indicated process variables. Instead, a wide range of variability in the characteristics of the product is found to exist due to non-uniformity in product density. To guarantee product repeatability particularly for graphite and ceramic products, the product density must be held to within a limited narrow range of density.

SUMMARY OF THE INVENTION

The isostatic molding process of the present invention comprises the steps of:

loading a powder charge of metal, carbon or ceramic into a mold assembly of known weight and volume;

weighing the mold assembly with the powder charge;

calculating the weight of the powder charge inside the mold assembly;

loading the mold assembly and powder charge into an isostatic pressure vessel;

filling the pressure vessel with a fluid medium;

pressurizing the pressure vessel;

weighing the combined mold assembly and powder charge inside the pressure vessel during pressurization;

calculating the weight of the powder charge inside the pressure vessel by computing the difference in weight between the mold assembly in the fluid medium inclusive and exclusive of the powder charge with the latter weight determined by the difference between the weight of the mold assembly outside of the pressure vessel and a product represented by its known volume multiplied by the density of the fluid; and computing the density of the compressed powder charge in accordance with the following algorithm:

$$\frac{W_m}{(W_m - W_{mf})\frac{1}{\rho_f}} = \rho_p$$

where $W_m$ = weight of powder charge in mold assembly outside of pressure vessel;

$W_{mf}$—weight of powder charge in fluid medium within the pressure vessel;

$\rho_f$—density of fluid medium;

$\rho_p$—density of power charge in vessel; and depressurizing the pressure vessel when the computed density for the compressed article equals a preselected product density.

BRIEF DESCRIPTION OF THE DRAWINGS

FIG. 4b shows a pressure versus time relationship corresponding to FIG. 4a;

FIG. 5b shows the pressure versus time relationship corresponding to FIG. 5a.

DETAILED DESCRIPTION OF THE INVENTION

Figure 1:
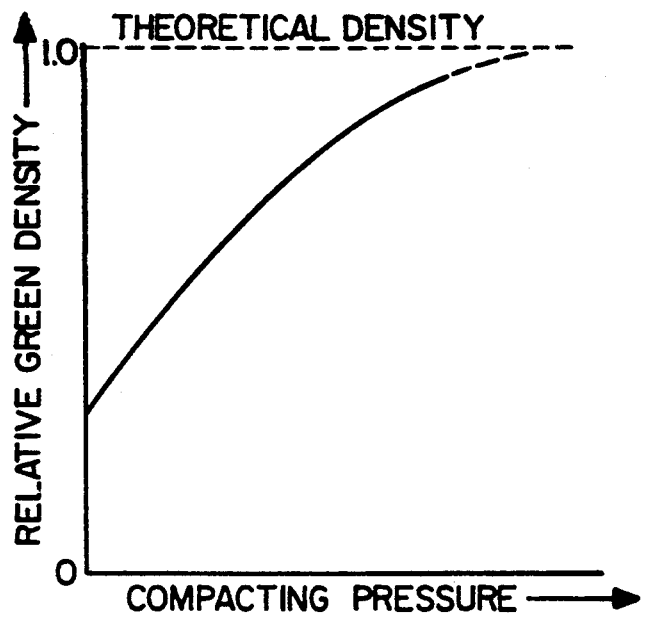
FIG. 1 is a typical density versus pressure relationship for cold isostatic pressing "CIP".

A typical density versus pressure relationship for a isostatically pressure molded product is illustrated in FIG. 1. In the conventional process of isostatic molding the relative green density of the product is established indirectly through its known correspondence with press pressure. The pressure in the pressure vessel is monitored and varied until a target pressure is achieved. Regulation of the actual pressure in the pressure vessel is accomplished by adjusting the rate of pressurization of the pressure vessel, the hold time at a given pressure level, temperature and the rate of depressurization. However, even under highly controlled pressure cycle conditions, variations in mold filling, molding powder preparation and temperature cause variations in the molded product density. It is the molded product density which governs product uniformity.

Figure 2:
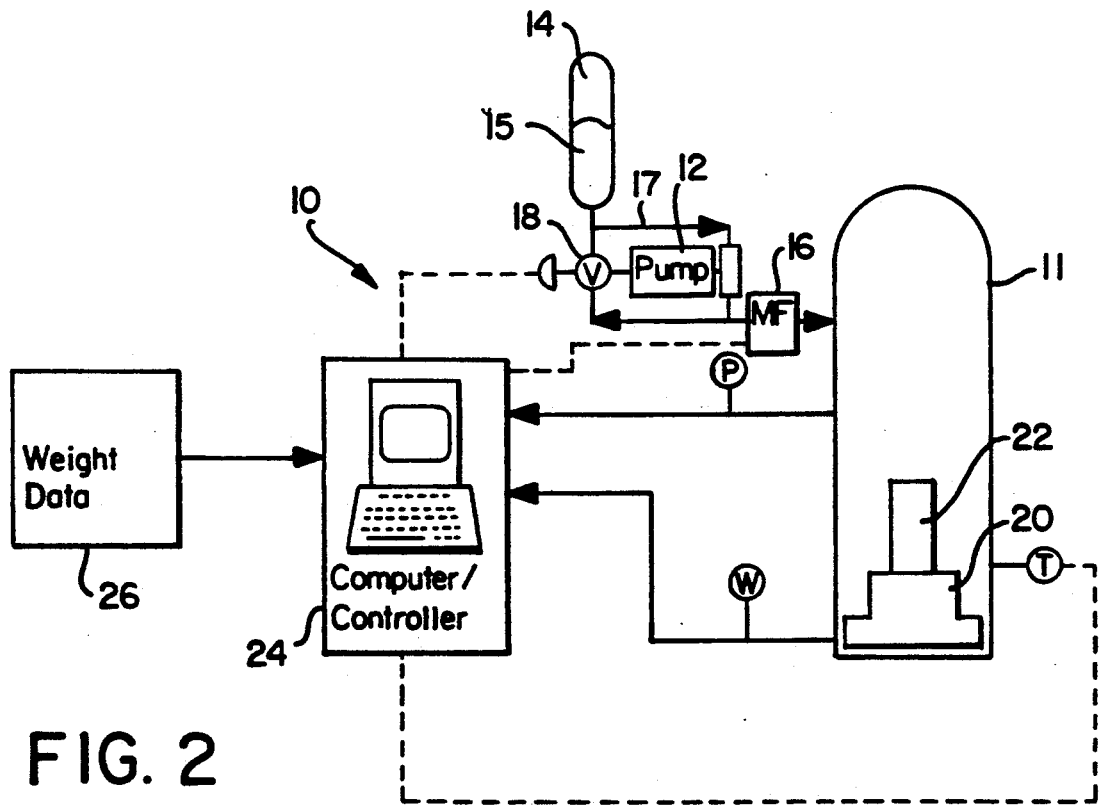
FIG. 2 is a block diagram of the isostatic molding system of the present invention.
Figure 3:
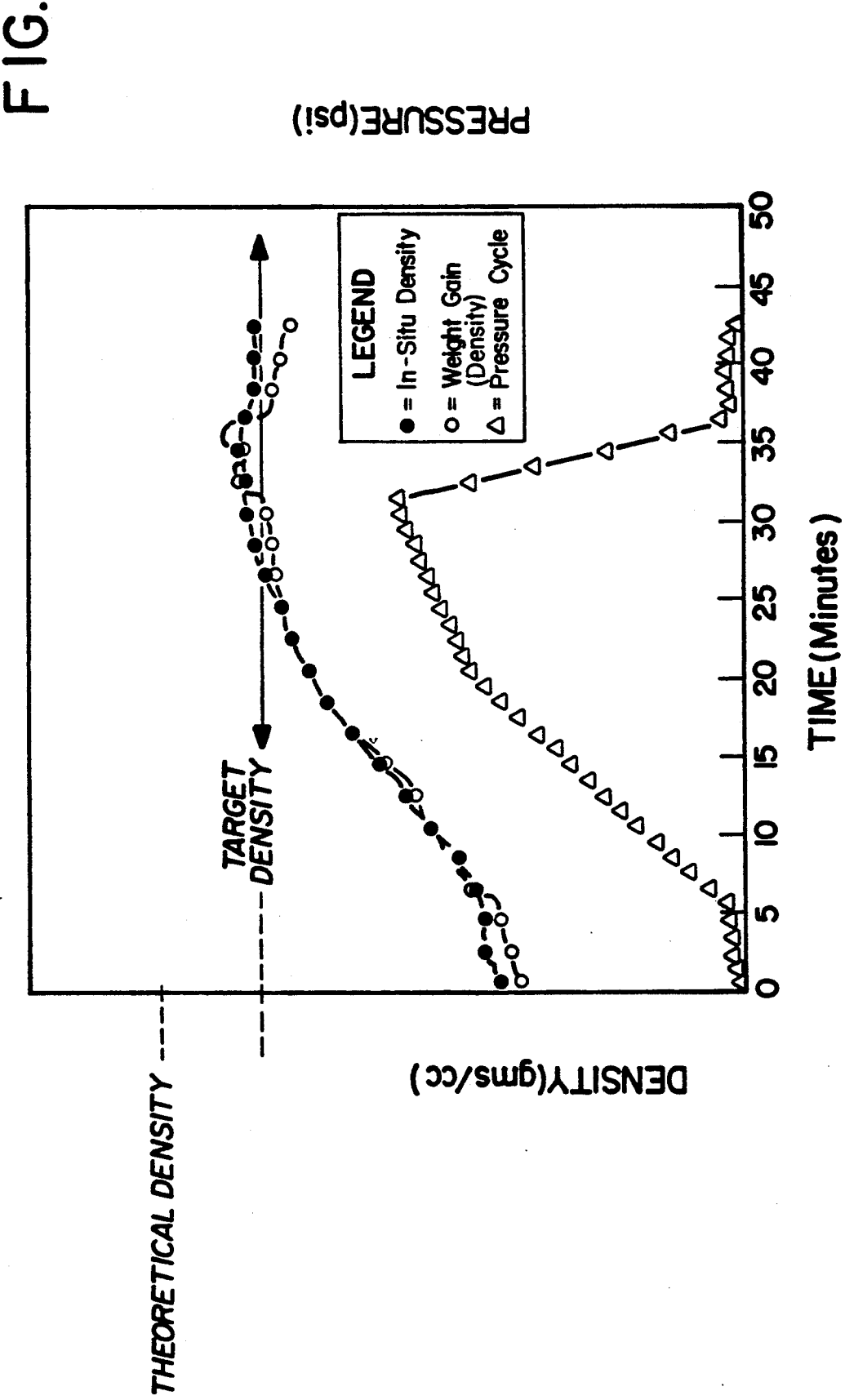
FIG. 3 is a time-density characteristic curve for a production run of a graphite billet in accordance with the Example described in the present invention.

The system 10 of the present invention as illustrated in FIG. 2 is designed to directly monitor the density of the powder charge in-situ during compaction. The system equipment, of itself, is conventional and includes a pressure vessel 11, a pump 12 and a liquid tank 14 containing an isostatic fluid 15 such as water. A mass flow meter 16 for measuring the quantity of fluid pumped into the pressure vessel is also desirable particularly for practicing the alternate embodiment of the invention which will be explained in greater detail later in the specification. The pump 12 is arranged in a control loop 17 containing a control valve 18 to permit the pump 12 to be operated throughout the operating cycle. The pressure vessel 11 is fitted with a weighing system 20 which allows a removable mold assembly 22 to be weighed during pressing in accordance with the process of the present invention. The system 10 is integrated to operate automatically in conjunction with a computer controller 24 although it may be operated manually.

To press a powdered composition into a densified compact shape, a conventional elastomeric mold or "bag" (not shown) of known weight is charged with the desired powder composition. The mold is then sealed to prevent ingress of isostatic fluid and loaded into a supporting structure (not shown) of conventional construction to form the mold assembly 22. The weight of the powder charge in the mold assembly is computed by simple subtraction of the weight of the mold with and without the powder charge. The mold assembly 22 is then placed in the pressure vessel 11. Prior to introduction into the pressure vessel 11 the weight and volume of all of the component parts of the mold assembly 22 are recorded. The weight and volume data are loaded into the computer controller 24 by an operator through a modem 26 or by hand.

The weighing system 20, as outfitted in the pressure vessel 11, consists of a conventional weighing platform (not shown) built into the bottom of the press with conventional load cells (not shown). The load cells must be capable of accurately measuring the underwater weight of the mold assembly 22. In the preferred embodiment the mold assembly 22 is weighed throughout the pressurization cycle. Accordingly, to accurately weigh the mold assembly under pressure the load cells should be hydrostatically compensated. Hydrostatically compensated load cells are presently commercially available.

The sequence of events that take place during a density controlled pressing cycle are as follows:

1. The mold assembly 22 is placed in the pressure vessel 11 on the weighing platform of the weighing system 20. The mold assembly 22 may optionally be warmed prior to and/or during introduction into the pressure vessel.

2. The pressure vessel 11 is filled with water and sealed.

3. The pressurization pump 12 is turned on and the controller 24 activated.

4. The controller 24 continuously calculates the in-situ density of the product during the press cycle as follows: Product Density=Powder Weight/Powder Volume
where:

Powder Weight=(Weight of mold assembly+powder)−Weight of mold assembly. This is determined outside the press.

Powder Volume=Total volume of (mold+powder)−Volume of mold

Total Volume of (Mold+Powder)=Weight of mold+powder outside the press (i.e., dry weight)−Weight of combined mold and powder during pressing (determined by load cells) divided by the density of the presssing fluid.

Density of pressing fluid=f(Temperature, Pressure and fluid composition)

The calculation of target density for the compressed powder charge may also be expressed in accordance with the following algorithm, which was derived from the above relationships:

$$\frac{W_m}{(W_m - W_{mf})\frac{1}{\rho_f}} = \rho_p$$

where $W_m$=weight of powder charge in mold assembly outside of pressure vessel;

$W_{mf}$=weight of powder charge in fluid medium within the pressure vessel;

$\rho_f$=density of fluid medium;

$\rho_p$=density of compacted power charge in vessel; and where $W_{mf}$ is computed from the difference in weight between the mold assembly in the fluid medium inclusive and exclusive of the powder charge with the latter weight determined by the difference between the weight of the mold assembly outside of the pressure vessel and a product represented by its known volume multiplied by the density of the fluid.

5. The pressure in the pressure vessel 10 is raised at a controlled rate while monitoring the product density. The pressure may be raised by a manual operation or continuously under automatic instruction from the controller 24.

6. When the computed product density reaches a preselected target density the pressure vessel 10 is depressurized. This preselected target density may be chosen to allow for springback of the billet during depressurization.

7. The system is depressurized at a controlled rate once the preselected density is achieved. The pump 12 is sized so that the bulk of the pump output flow always goes back through the control valve 18 to its suction side. In this way, the control loop can be more easily tuned for both pressurization and depressurization.

8. The product is removed from the press and unloaded from the mold assembly.

The real time computation of product density in-situ is based upon the use of Archimedes' principle of buoyancy which equates buoyant force in a fluid medium to the weight of the body of fluid which a submerged body displaces. The product density is equal to the powder charge weight divided by the powder charge volume. The weight of the powder charge outside the mold assembly is readily calculated. Since the density of the isostatic fluid is known based upon the fluid composition, temperature and pressure the powder volume in-situ becomes simply a weight relationship permitting in-situ density to be calculated directly from weight and volume data. The algorithm for product density as expressed heretofore was computed from the above analytical relationships and may be expressed in many different ways.

The real time computation of product density in-situ may also be computed by an alternative procedure involving an initial computation of powder density at an initial preselected press pressure or before pressure is applied. Once this initial powder density is computed every pound of incompressible fluid pumped into the press results in a weight gain of one pound as the powder densifies. The controller can therefore use the initial density computation and calculate the amount of fluid added into the pressure vessel in pounds during the press cycle. The added fluid can be measured by the mass flow meter 16 or alternatively by a level drop in a feed reservoir. The controller 24 then calculates product density by a recomputation of "Wmf" by means of simple addition of the weight of the powder charge at the initial condition, i.e., at the preselected press pressure or before pressure is applied and the weight of fluid added into the pressure vessel. Once "Wmf" is recomputed the final density is computed in accordance with the algorithm of page 7 as hereafter restated:

$$\frac{Wm}{[Wm - W_{mf}(\text{initial} + \text{final})]\frac{1}{\rho_f}} = \rho_p$$

Where $W_{mf}$ is computed, at the initial condition with pressure either at ambient or a preselected value above ambient, as heretofore described by computing the difference in weight between the mold assembly in the fluid medium inclusive and exclusive of the powder charge with the latter weight determined by the difference between the weight of the mold assembly outside of the pressure vessel and a product represented by its known volume multiplied by the density of the fluid. $W_{mf}$ at the final condition equals the weight of fluid added into the pressure vessel.

Figure 4A:
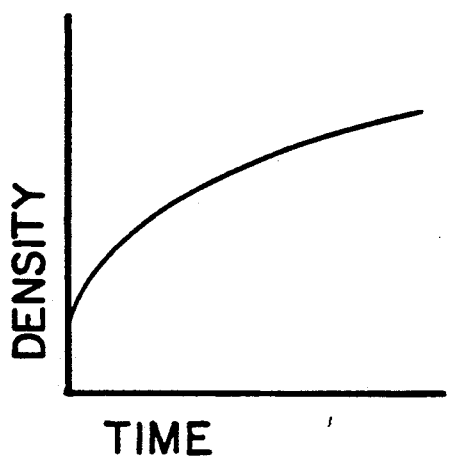
FIG. 4a shows a typical density versus time relationship for isostatic molding under conventional practice where pressure is varied linearly to control green density.
Figure 4B:
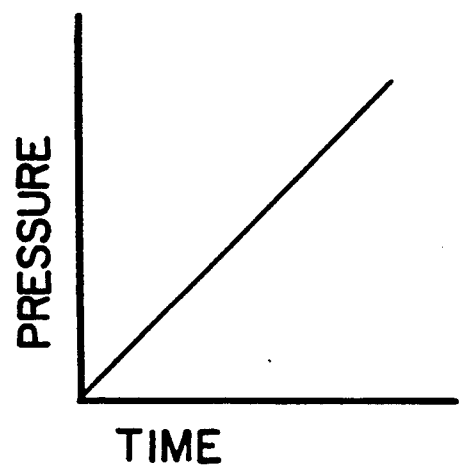
Figure 5A:
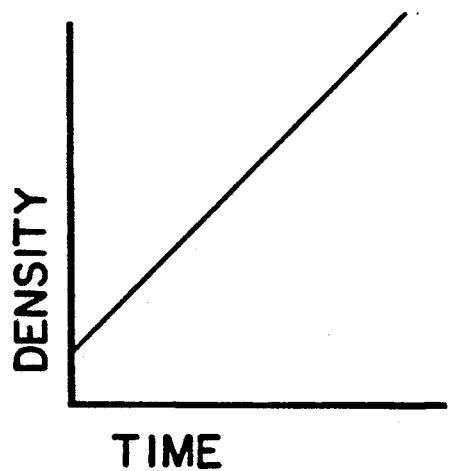
FIG. 5a shows a density versus time relationship for isostatic molding following the practice of the present invention.
Figure 5B:
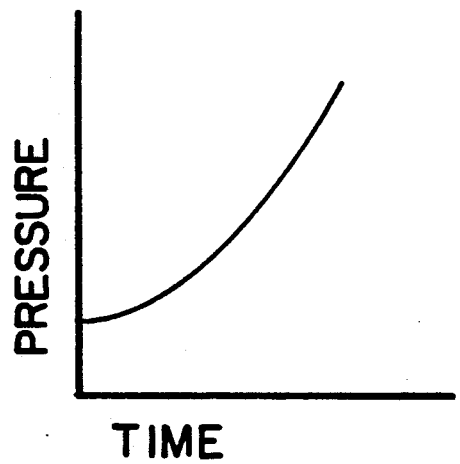

FIGS. 4a and 4b illustrate the conventional density and pressure relationship with respect to time respectively. The non linear density versus time curve results from the indirect control of density using pressure as the control variable. In the present invention density, itself, is the control variable and may be linearly varied with time resulting in a nonlinear pressure versus time relationship as exemplified in FIGS. 5a and 5b. In the alternative embodiment of the invention density is measured and controlled in-situ by regulating the fluid added to the pressure vessel. This may be done in combination with the principal embodiment or used solely to check the results obtained following the practice of the principal embodiment. It should also be understood that direct control of density permits the relationship of density with time to follow any desired pattern including a curve where density is held relatively constant over a fixed time until, for example, the final density is approached and/or during the period of depressurization.

EXAMPLE OF INSITU-DENSITY CONTROL

In this example, a molding powder was prepared from a fine grain carbonaceous filler material mixed with a coal tar pitch binder.

A cylindrical rubber molding bag and top closure weighing 7.392 pounds and having a density of 57.81 lbs/ft$^3$ was used as a mold. The bag was placed in a stainless steel cylindrical holder weighting 20.40 pounds and having a volume of 0.1176 ft$^3$. A vacuum applied to the outside of the holder pulled the bag tight against the holder as powder was loaded into the bag. The powder was deairated during bag filling by vertically jolting the assembly 71 times. A rubber top closure containing a flanged stainless steel valve was then sealed to the bag with hose clamps. The valve weight was 0.9546 lb; its volume of 0.00225 ft$^3$.

Air was removed from the loaded and sealed mold assembly with a vacuum pump. The mold assembly was then warmed to a desired molding temperature before placement in the press.

The press computer control system prompts the operator for the weight of the molding bag, a stainless steel holder identification letter, in this case "E", and the final weight of the loaded mold assembly. The computer then calculates three numerical constants that it will use to control the pressing cycle.

Constant #1 = (Total Weight−Metal Frame Weight−Bag Weight)/62.428. This is equal to the weight of molding powder in lbs÷62.428; in this example = 1.724.

Constant #2 = −1×(Metal Frame Volume+Rubber Bag Volume). This is equal to the negative of the volume in cubic feet of all but the molding powder; in this example = −0.23117.

Constant #3 = Total weight of mold assembly in pounds; in this example = 135.4.

During the press cycle, the computer calculates the density of the molding powder billet in grams/cc as follows.

Density = Constant #1/

$$\left(\frac{\text{Constant \#3} - \text{Total immersed Weight}}{\text{Density of Press Water}} + \text{Constant \#2}\right)$$

The computer measures the total immersed weight with an underwater load cell. It calculates the density of the press water in lbs/ft$^3$ by measuring the press temperature and pressure using the following known relationship:

Water density lbs/ft$^3$ = 62.8356 − 1.3688×10$^{-2}$(T °C.) − 1.9029×10$^{-4}$(T °C.)$^2$ + 2.6281×10$^{-7}$(T °C.)$^3$×Exp[3.447×10$^{-6}$×Pressure (psig)]

The computer control program is divided into seven segments. After the assembly is loaded into the press and the air is bled from the system, the computer program is started.

Segment #1

During the first 90 seconds of the program, the assembly is supported by a hydraulic cylinder rather than the load cells. At this time, the computer stores the load cell reading with no load as the "tare" weight. The weight is then lowered until it is supported by the load cell.

When the pump is turned on, the computer controls the press pressure at 25 psig for five minutes. At the end of this five minute period, the computer checks to see if stable control of ±2 psi from the setpoint has been achieved. If it has, the computer stores the current density reading as the initial billet density and advances the program to segment #2.

During segment #2, the billet density is calculated by three different methods. This is a feature of the Pilot Plant system aimed at comparing the accuracy of each method. Only one of the methods is necessary in order to obtain accurate control of density.

Since the load cell zero shift is usually linear and reproducible, method #1 uses a stored factor based on a calibration of zero shift in order to correct load cell readings. In this method, for this example, the corrected load cell reading equals the Raw Load Cell Reading − Tare weight Stored in Segment #1 − (0.001×System Pressure in psig).

In method #2, no calibration is stored in the computer. Instead, the zero shift is determined directly during segment #3 by taking the weight off of the load cell while the system is under pressure. This is accomplished with an underwater hydraulic linkage that the computer activates during segment #3. Segment #3 is triggered when the billet density is close to its target value. The corrected load cell readings by this method are obtained as follows:

| | |
|---|---|
| Segment #1 to Segment #3 | Corrected Reading = Raw Indication - Segment #1 Tare Weight |
| Segment #4 to Segment #7 | Corrected Reading = Raw Indication - Segment #3 Tare Weight |

In method #3, the load cell readings are only used to obtain an initial density during segment #1. After that, billet density is calculated by measuring the amount of water pumped into the press. This compares with load cell readings since (barring water leaks) every pound of water pumped in should increase the immersed weight of the billet by one pound.

Segment #3 is triggered when the billet density calculated by method #1 reaches a first target density level selected to be approximate (just below) the desired final target density.

Segment #3

This program segment lasts two minutes. While the program is in segment #3, it locks in the density values calculated at the end of segment #2. The pressure setpoint is also held constant. The computer activates a hydraulic linkage which removes the weight from the load cell. It holds the weight off for 90 seconds while the tare weight for the density calculation by method #2 is updated. The tare weight for method #1 is left unchanged. After the new tare weight is locked in, the weight is returned to its position on the load cell.

At the end of segment #3, segment #4 begins and density by all three methods resumes being calculated.

Segment #4

During this segment, the pressure is ramped up at a rate of 10psi/min. The billet density is calculated continuously and when it reaches the final target valve, the computer advances to segment #5. The final target density is selected in order to obtain the desired value after "spring back". "Spring back" is a small density drop that occurs as the pressure is released.

Segment #5

The pressure is ramped down at a rate of 100 psi per minute to 35 psi.

Segment #6

The pressure is held at 35 psi for three minutes. This allows stable low pressure readings to be taken of final billet density with sufficient pressure to keep the rubber molding bag tight on the billet.

Segment #7

During this segment, all of the pressure is released and the computer prints the results of the pressing cycle.

Billet Inspection

The billet was removed from the press and taken out of its frame and inspected. The billet was then weighed in and out of water to check its density.

I claim:

1. An isostatic method for molding metal, carbon or ceramic particles into a densified compact having a preselected density comprising the steps of:
   (a) loading a powder charge of metal, carbon or ceramic into a mold assembly of known weight and volume;
   (b) weighing the mold assembly with the powder charge;
   (c) calculating the weight of the powder charge inside the mold assembly;
   (d) loading the mold assembly and powder charge into an isostatic pressure vessel;
   (e) filling the pressure vessel with a fluid medium;
   (f) pressurizing the pressure vessel;
   (g) weighing the combined mold assembly and powder charge inside the pressure vessel during pressurization;
   (h) calculating the weight of the powder charge inside the pressure vessel by computing the difference in weight between the mold assembly in the fluid medium inclusive and exclusive of the powder charge with the latter weight determined by the difference between the weight of the mold assembly outside of the pressure vessel and a product represented by its known volume multiplied by the density of the fluid; and
   (i) computing the density of the compressed powder charge in accordance with the following algorithm:

$$\frac{W_m}{(W_m - W_{mf})\frac{1}{\rho_f}} = \rho_p$$

where
   $W_m$ = weight of powder charge in mold assembly outside of pressure vessel;
   $W_{mf}$ — weight of powder charge in fluid medium within the pressure vessel;
   $\rho_f$ — density of fluid medium;
   $\rho_p$ — density of power charge in vessel; and
   depressurizing the pressure vessel when the computed density for the compressed article equals a preselected product density.

2. An isostatic method according to claim 1 wherein said mold assembly is removable from said pressure vessel for loading and unloading said power charge.

3. An isostatic method according to claim 2 wherein the pressure vessel is pressurized at a controlled rate.

4. An isostatic method according to claim 2 wherein the pressure vessel is pressurized, so as to produce a controlled product density versus time relationship.

5. An isostatic method according to in claim 3 wherein the mold assembly inside the pressure vessel is weighed intermittently during pressurization.

6. An isostatic method according to claim 5 wherein the pressure vessel is depressurized at a controlled rate.

7. An isostatic method according to claim 1 wherein the loaded mold assembly is warmed to a predetermined temperature before it is placed in the pressure vessel.

8. An isostatic method according to claim 1 wherein the pressure vessel is pressurized to a first predetermined pressure and further comprising the steps of:
   computing the density of the powder charge in the pressure vessel at said first predetermined pressure using step (i);

measuring the amount of fluid pumped into said pressure vessel; and computing the final density of the compact charge based upon the increase in the amount of fluid pumped into the pressure vessel after reaching said first predetermined pressure.

9. An isostatic method according to claim 8 wherein said first predetermined pressure is ambient pressure.

10. An isostatic method according to claim 8 wherein said first predetermined level above ambient preselected pressure.

11. An isostatic method according to claim 10 wherein said final density is computed in accordance with step (i) with $W_{mf}$ computed first at an initial condition corresponding to said first predetermined pressure and then at a final condition based upon the weight of fluid added to the pressure vessel and added together to compute final density.

* * * * *